United States Patent [19]

Rinaldi

[11] Patent Number: 5,110,031
[45] Date of Patent: May 5, 1992

[54] WELD SUPORTING RING FOR PIPES

[75] Inventor: Fernando Rinaldi, Milan, Italy

[73] Assignee: Atlantic Point Inc., Panama

[21] Appl. No.: 639,902

[22] Filed: Jan. 10, 1991

[30] Foreign Application Priority Data

Nov. 2, 1990 [NL] Netherlands .......................... 9002397

[51] Int. Cl.⁵ ............................................ B23K 37/04
[52] U.S. Cl. ...................... 228/50; 228/216; 219/160
[58] Field of Search ............... 228/50, 216, 49.3, 44.5; 219/160, 61.1

[56] References Cited

U.S. PATENT DOCUMENTS

| 2,780,194 | 2/1957 | Croswell | 228/49.3 |
| 3,633,813 | 12/1972 | Looney | 228/216 |
| 3,699,635 | 10/1972 | Bradley et al. | 29/252 |
| 3,937,382 | 2/1976 | Cunningham et al. | 228/50 |
| 3,960,311 | 6/1976 | Griffiths | 228/50 |
| 4,165,831 | 8/1979 | Connell | 228/50 |
| 4,201,326 | 5/1980 | Connell | 228/50 |
| 4,216,896 | 8/1980 | Chang et al. | 228/50 |
| 4,285,458 | 8/1981 | Slavens | 228/50 |
| 4,363,954 | 12/1982 | Rinaldi | 228/50 |
| 4,648,544 | 3/1987 | Puisais et al. | 228/44.5 |

FOREIGN PATENT DOCUMENTS

| 733945 | 5/1980 | U.S.S.R. | 228/50 |
| 993755 | 6/1965 | United Kingdom | 219/160 |

Primary Examiner—Richard K. Seidel
Assistant Examiner—Jeanne M. Elpel
Attorney, Agent, or Firm—Ostrolenk, Faber, Gerb & Soffen

[57] ABSTRACT

For internally supporting the annular weld during welding together of two pipe ends of two pipes extending mutually in line a weld supporting ring is used consisting of ring pieces comprising at least one supporting body of ceramic material bounding the outer periphery of the weld supporting ring.

12 Claims, 4 Drawing Sheets

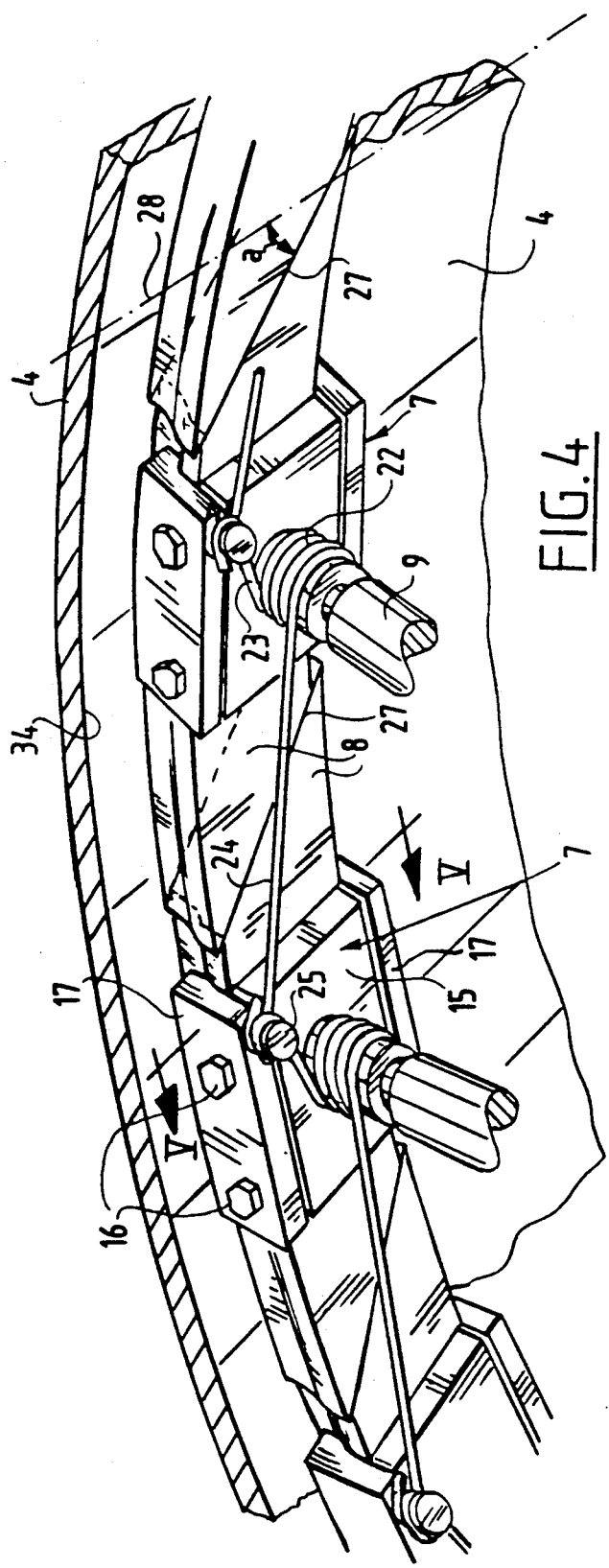
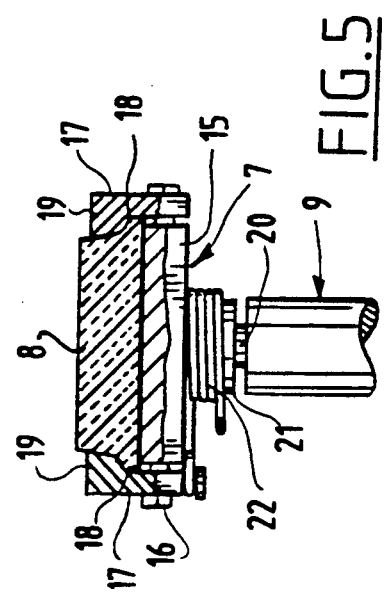
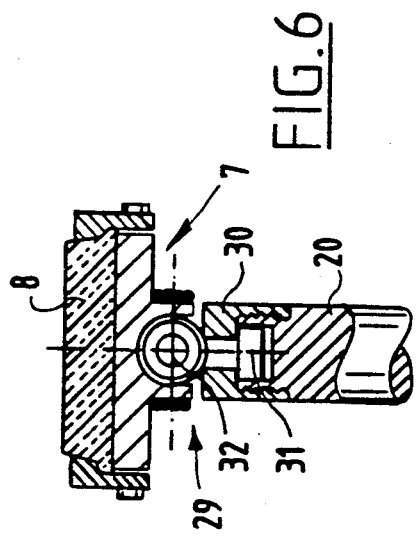

WELD SUPORTING RING FOR PIPES

The invention relates to a weld supporting ring for internally supporting the annular weld during welding together of two pipe ends of two pipes extending mutually in line.

Such a weld supporting ring is known from GB-1528775. Therein each ring piece has a supporting body of copper which bounds the outer periphery of the weld supporting ring and prevents the welding bead penetrating inside the pipe passage, since with some deformation the copper supporting body can be well adapted to the inner periphery of the pipes for welding to each other. Using copper, heat is extracted from the welding bead so that the bead solidifies immediately, doing so precisely on the continuous inner surface of the pipes for welding together. The copper supporting body is subject to heavy wear and therefore has to be replaced often. In the case of an incorrect setting of the welding process the copper supporting body can melt more or less fixedly to the weld.

The invention has for its object to improve the weld supporting ring such that it has a longer stand time. For this purpose the weld supporting ring according to the invention comprises a crown of ring pieces distributed over the periphery, wherein the ring pieces each comprise at least one supporting body of ceramic or ceramic-like material bounding the outer periphery of the weld supporting ring. The supporting bodies of ceramic or ceramic-like material can resist the welding heat well. The supporting bodies insulate the weld instead of extracting heat from the weld. Such an arrangement results in a better fusing of the pipe material with the welding material. A better weld is thus created on the inside of the pipes at that place where the weld comes into contact with material that may be transported through the pipes.

The weld supporting ring for internally supporting the annular weld during welding together of two pipe ends of two pipes extending mutually in line can be embodied as a ring that is well joined together if ring pieces are mutually coupled by means of spring means which press the contact surfaces of the ring pieces against each other.

Mentioned and other features according to the invention will be elucidated in the description following hereinbelow with reference to a drawing, wherein:

FIG. 1 shows a weld supporting ring according to the invention arranged in two pipes for welding to one another;

FIGS. 2 and 3 each show a section along the lines II—II and III—III respectively from FIG. 1;

FIG. 4 shows on a larger scale a perspective view of a portion of the weld supporting ring viewed along the arrow IV shown in FIG. 2;

FIG. 5 is a section along the line V—V of FIG. 4,

FIG. 6 is a variant of the detail of FIG. 5; and

Figure 1:
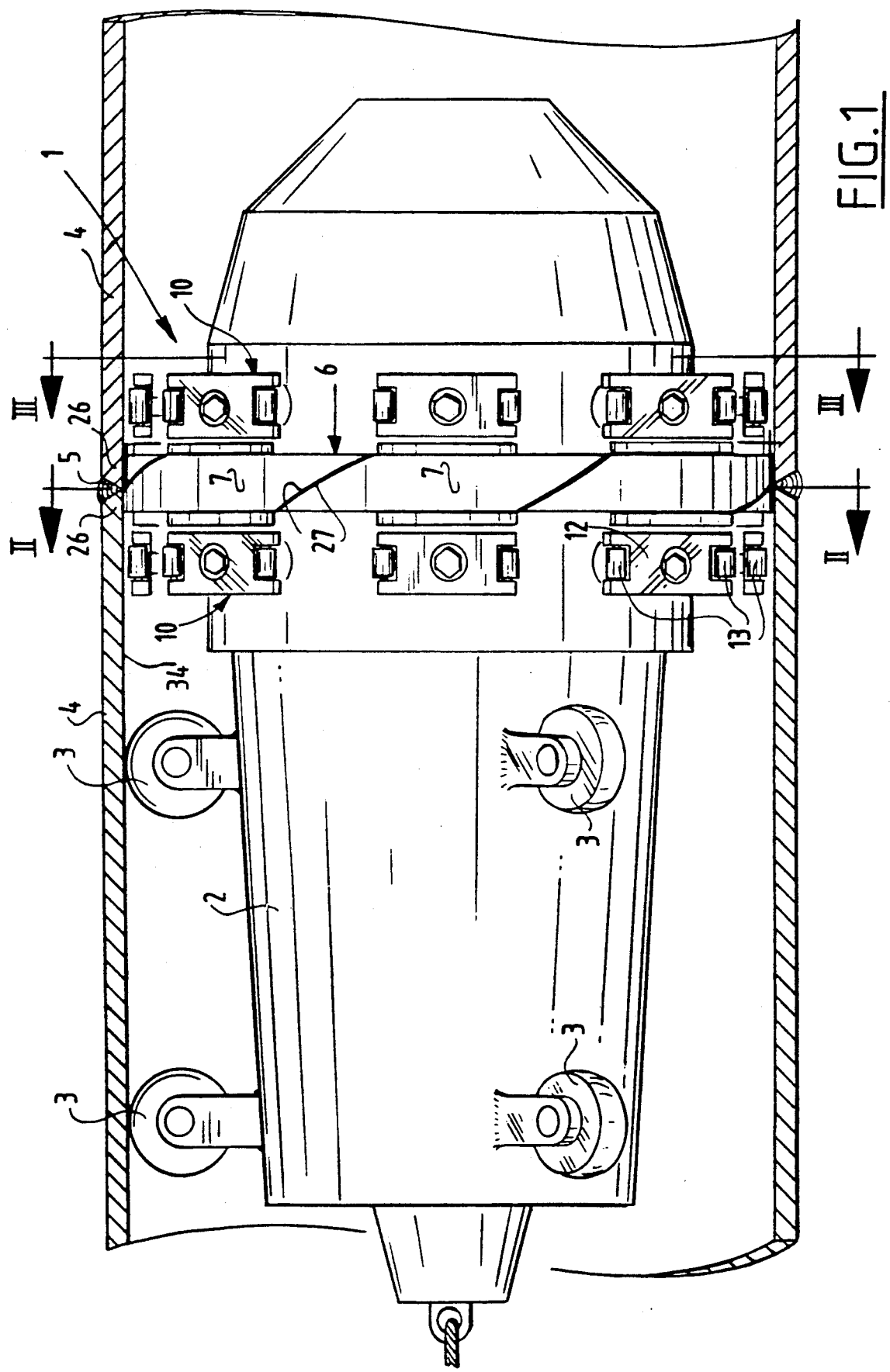
Figure 2:
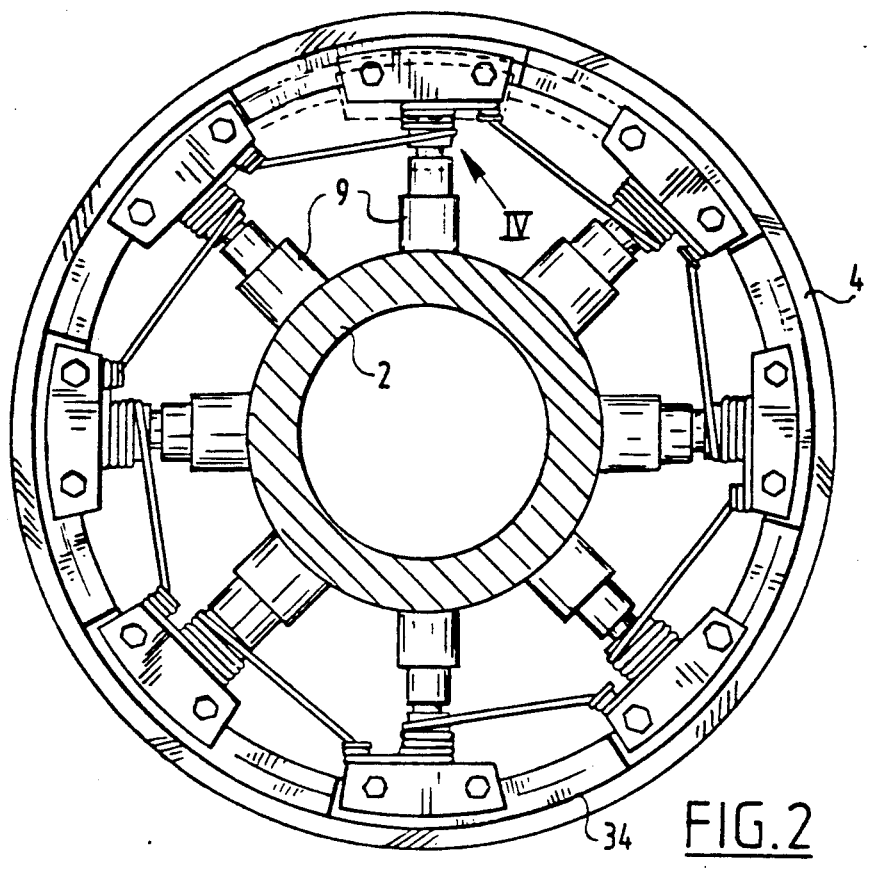
Figure 3:
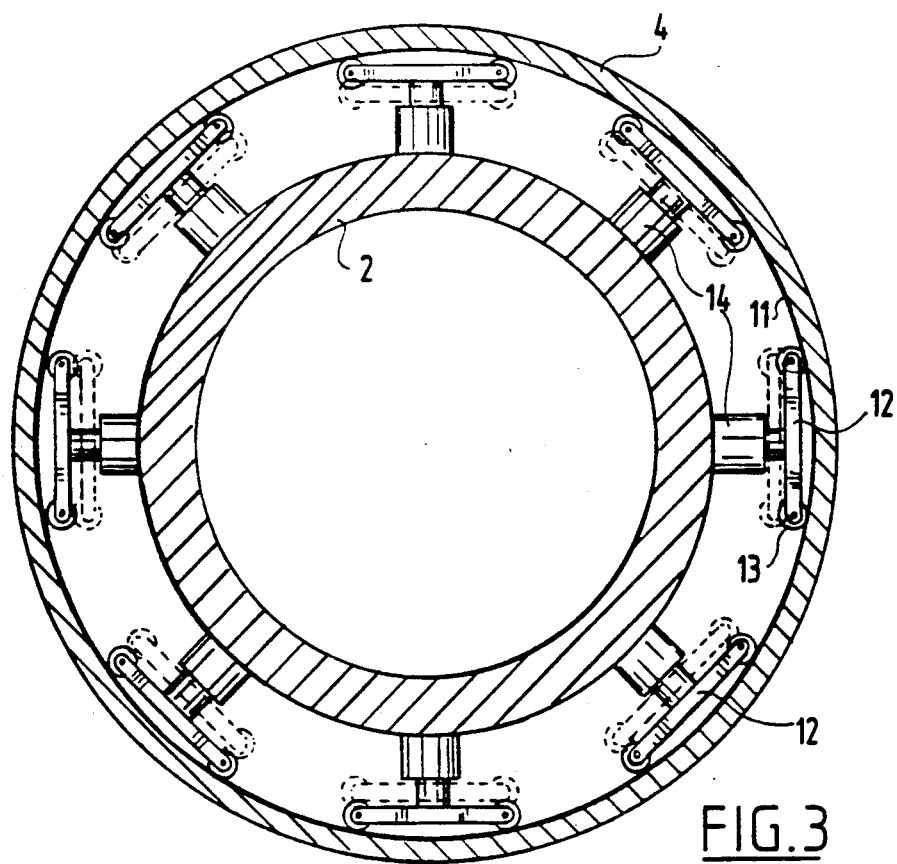

The weld supporting ring 1 of FIGS. 1-5 comprises a core 2 which is rolled into position by means of rollers 3 inside two identical pipes 4 which are disposed mutually in line and against one another and which have to be joined together along a ring weld 5. The pipe ends 26 are chamfered beforehand to facilitate positioning of the identical pipes against one another for welding.

The weld supporting ring 1 comprises a first crown 6 of ring pieces 7 distributed over the periphery which each comprise a supporting body 8 of ceramic or ceramic-like material bounding the outer periphery of the weld supporting ring 1. Each ring piece 7 is supported on the core 2 by means of radially extensible ring supports 9 formed by pneumatic or hydraulic cylinders which mutually communicate with conduits (not drawn) such that the pressure in all cylinders is the same. Situated on either side of first crown 6 is a second crown 10 of support elements 12 which contact by means of two rollers 13 onto the inner periphery 11 of a pipe 4 and which each support on the core 2 by means of radially extensible supports 14. These supports 14 of each crown consist of pneumatic or hydraulic cylinders which mutually communicate to effect a supporting pressure distributed uniformly over the periphery.

Each ring piece 7 comprises a base 15 and two clamping pieces 17 which are connected thereto on either side by means of bolts 16. Adapted clamping jaws 19, integral with the two clamping pieces 17, fixedly hold the supporting body 8 by gripping two side ribs 18 of the supporting body 8.

Gripping round the piston rod 20 of support 9 is a spring support 21 round which is wound a spring 22, the one end 23 whereof grips onto this ring piece 7 while the other end 24 of this spring 22 grips onto a pin 25 of an adjoining ring piece 7.

The supporting bodies 8 adjoin each other along contact surfaces 27 which enclose an acute angle a with lengthwise planes 28 of the weld supporting ring 1.

At least six ring pieces 7 are present, although preferably there are at least eight and more preferably an even greater number.

It is conceivable that with a different construction of the ring pieces 7 considerably more ceramic supporting bodies are present so that a supporting body is present for each 1 to 2 cm of the first crown 6. The supporting bodies are of ceramic or ceramic-like material which has low wear and high heat insulation, while it does not give off to the welding melt any substances adversely affecting the weld. The ceramic or ceramic-like material is for instance fired or sintered material on a base of silicon oxide in which metal powder is incorporated. The ceramic or ceramic-like material may contain one or more substances, for example two substances with differing percentages of aluminium and/or titanium and possibly other elements.

The ring piece 7 drawn in FIG. 6 is fixed via a cardan hinge 29 to a piston rod 20 with a nut 30 such that it can turn about the radial axis 31 and a horizontal axis 32, thus enabling a still better adaptation of the supporting body 8 to any variations in the internal pipe surfaces 34.

Figure 7:
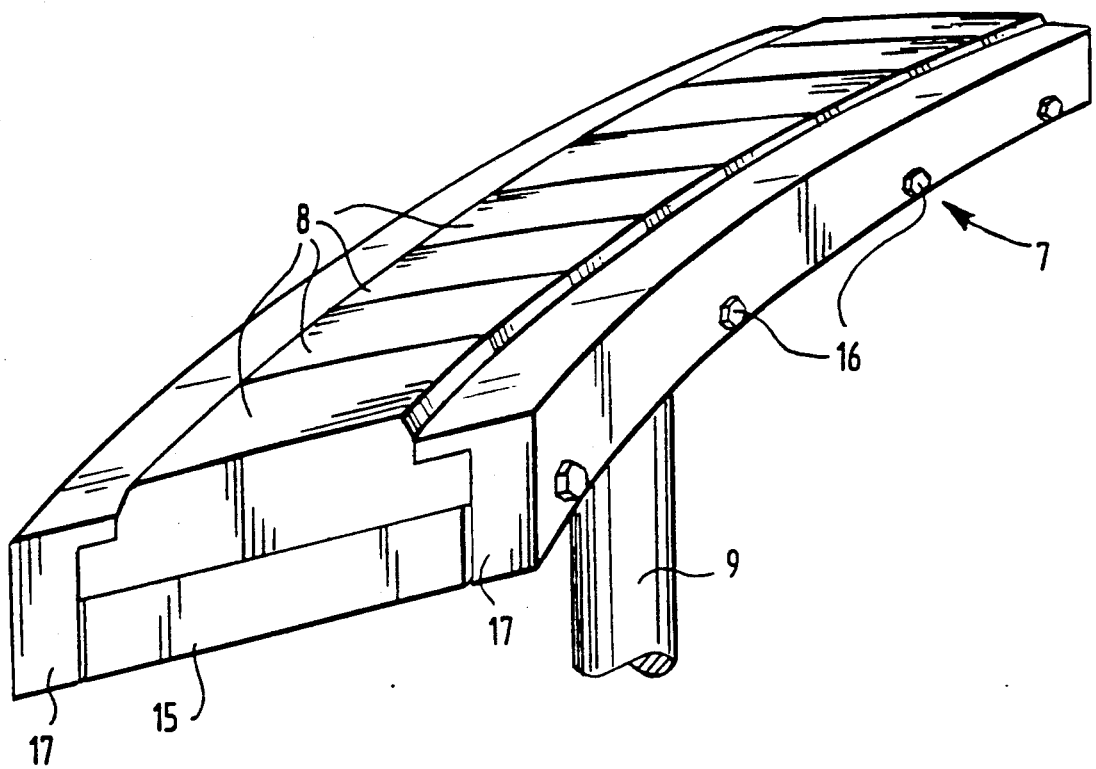
FIG. 7 is a perspective view of another ring piece for a weld supporting ring according to the invention.

Instead of a supporting body 8 in one piece the ring piece 7 of FIG. 7 has a considerable number of small rhombic supporting bodies 8 which are carried by a common rhombic base 15 and which are clamped fixedly by means of clamping pieces 17. The metal portions of base 15 and clamping pieces 17 can then be slightly elastically deformable while the supporting bodies 8 still remain well pressed against each other. This enables an even better adaptation to diameter differences and unroundness.

I claim:

1. A weld supporting ring for internally supporting an annular weld during welding together of two pipe ends of two pipes extending mutually in line, including a plurality of ring pieces, each ring piece comprising at least one supporting body bounding the outer periphery of the weld supporting ring, wherein each ring piece has a spring support connected thereto and a spring wound around the spring support, wherein an end of the spring grips onto the ring piece and the other end of the spring grips onto an adjoining ring piece.

2. A weld supporting ring as claimed in claim 1, wherein the weld supporting ring comprises a first crown of ring pieces distributed over a periphery thereof, the ring pieces being mutually adjoining along contact surfaces oriented at an acute angle with respect to the supporting ring and pipes.

3. A weld supporting ring as claimed in claim 1, further comprising means for radially extendably supporting the plurality of ring pieces on a core, arranged inside the pipes for welding the pipes to each other.

4. A weld supporting ring as claimed in claim 1, further comprising a second crown of support elements located on either side of the first crown for contacting the inner periphery of the pipes, and means for radially extendably supporting the second crown on a core arranged inside the pipes for welding the pipes to each other.

5. A weld supporting ring as claimed in claim 1, wherein the supporting bodies are rhombus-shaped.

6. A weld supporting ring as claimed in claim 1, wherein at least on ring piece comprises a plurality of supporting bodies held in a common holder.

7. A weld supporting ring as claimed in claim 1, wherein each ring piece of the weld supporting ring is supported via a cardan hinge.

8. A weld supporting ring as claimed in claim 1, wherein said supporting body is made of a ceramic material.

9. A weld supporting ring for internally supporting an annular weld during welding together of two pipe ends of two pipes extending mutually in line, including a plurality of ring pieces mutually coupled by spring means for pressing contact surfaces of the ring pieces against each other, wherein an end of said spring means is connected to one of said ring pieces and an opposing end of said spring means is connected to an adjoining ring piece.

10. A weld supporting ring as claimed in claim 9, wherein at least one ring piece comprises a plurality of supporting bodies held in a common holder.

11. A weld supporting ring as claimed in claim 10, wherein said supporting bodies are made of a ceramic material.

12. A weld supporting ring as claimed in claim 10, wherein the supporting bodies are rhombus-shaped.

* * * * *